United States Patent [19]
Bliss

[11] 3,763,636
[45] Oct. 9, 1973

[54] GROUND ENGAGING ROTARY BALER

[75] Inventor: John W. Bliss, Vinton, Iowa
[73] Assignee: Starline, Inc., Harvard, Ill.
[22] Filed: Aug. 14, 1972
[21] Appl. No.: 280,599

[52] U.S. Cl............................ 56/16.4, 56/1, 56/341
[51] Int. Cl............................................. A01d 75/00
[58] Field of Search ................. 56/1, 341, 342, 343, 56/16.4

[56] References Cited
UNITED STATES PATENTS
3,110,145  11/1963  Avery ...................................... 56/1
3,611,693  10/1971  Geary ................................... 56/343
3,680,296  8/1972  Beebout............................. 56/16.4

*Primary Examiner*—Russell R. Kinsey
*Attorney*—Axel A. Hofgren et al.

[57] ABSTRACT

Apparatus for rolling hay into a bale in contact with the ground. A wheeled frame, either self-propelled or towed by a farm tractor, provides a baling chamber which is open at the bottom. Elevating conveyor means at the rear of the chamber picks up material and pushes it forward as the machine advances along a swath. Separate traction conveyor means extends forwardly from the elevating conveyor means to assist in rolling the material and to compact it, and rises as the bale increases in size. When the bale reaches a predetermined size, the elevating conveyor means swings out of the way to release the bale from the chamber.

46 Claims, 6 Drawing Figures

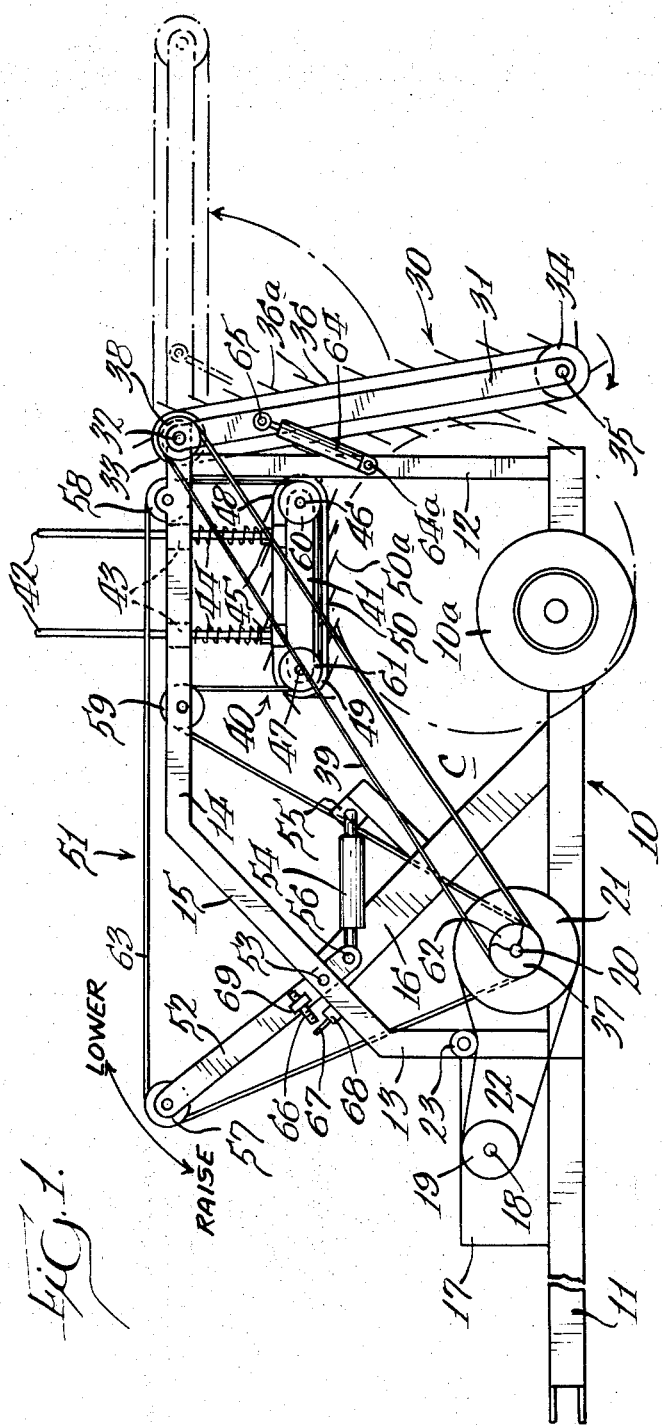

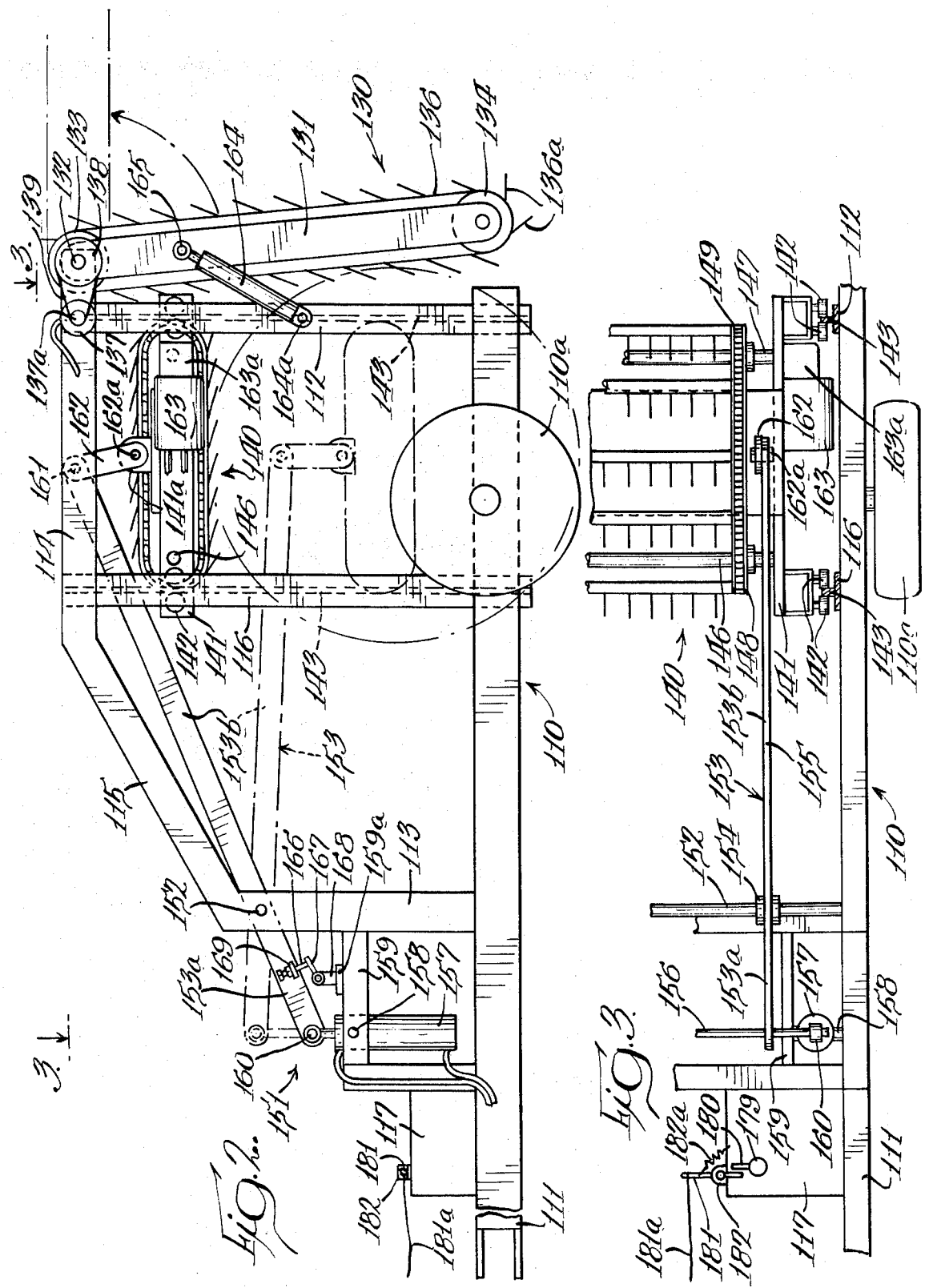

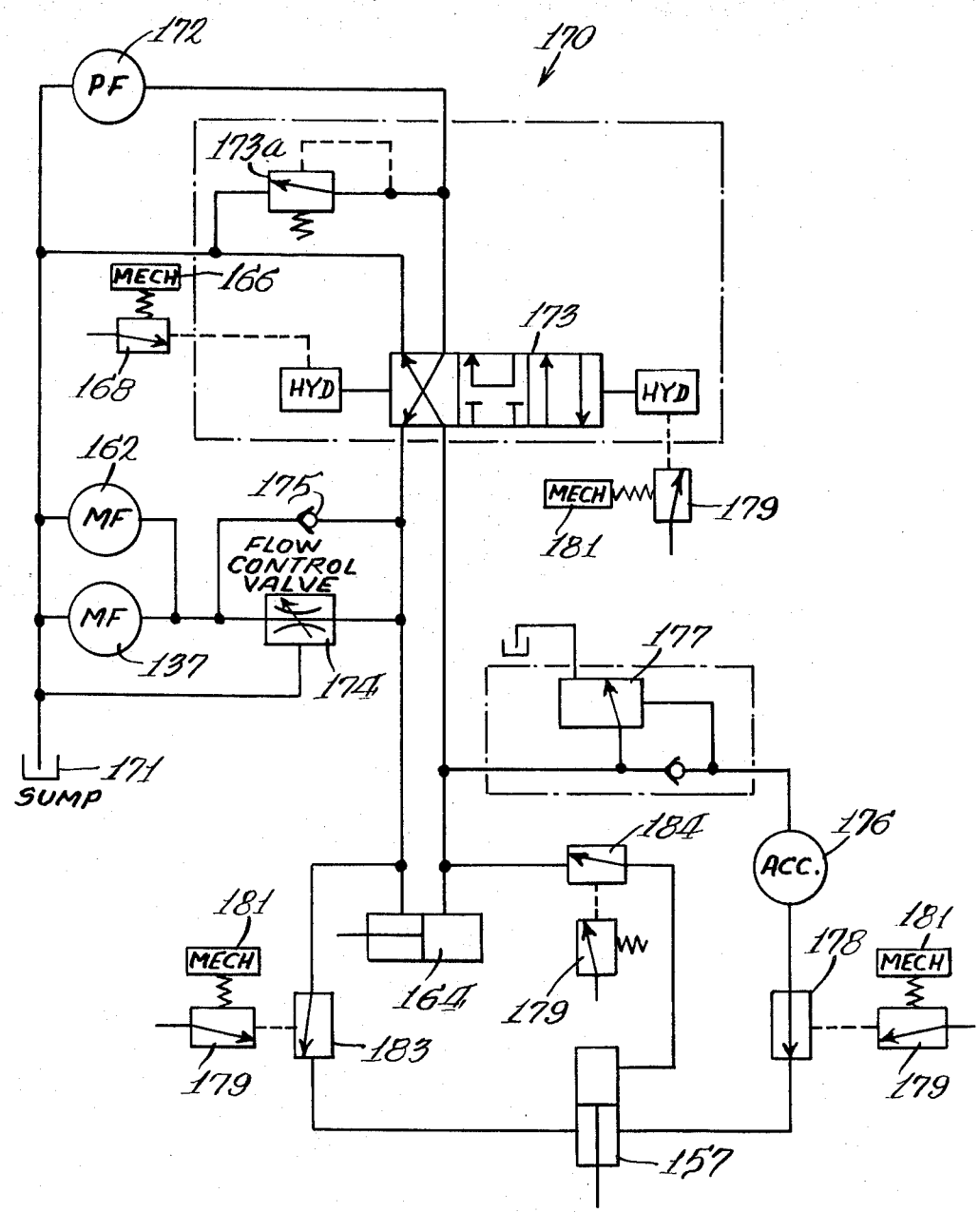

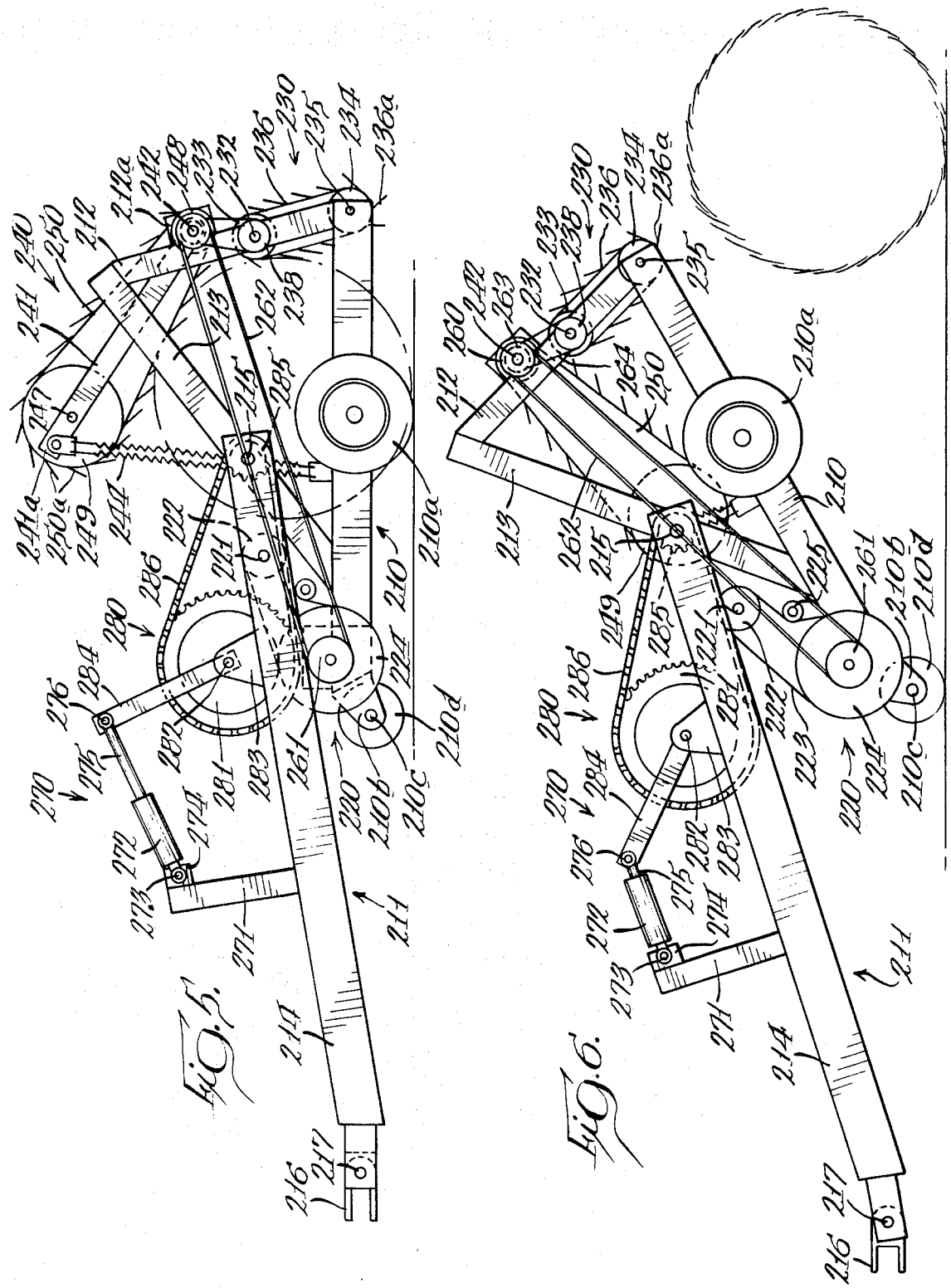

GROUND ENGAGING ROTARY BALER

BACKGROUND OF THE INVENTION

Heretofore there have been two basic types of apparatus developed for rolling hay or other fodder crops in a swath or windrow into a bale in contact with the ground. One is disclosed in Avery U.S. Pat. No. 3,110,145, issued Nov. 12, 1963. The Avery balers have a set of baling chains which are carried on three sprocket sets in a generally triangular arrangement with a bale forming run at the base of the triangle. The set of sprockets at the apex of the triangle moves downwardly as a bale increases in size in order that the baling run may arch upwardly around the forming bale. Such balers roll the swath or windrow much like rolling a rug in contact with the floor, and the tightness of the bale is determined by adjustment of springs which are operatively connected to the top sprocket set. The Avery baler presents a few operating problems, perhaps the most significant of which is that the high arching of the bale forming run of chain as the bale "grows" makes it difficult to release the bale without some loosening of the outer layers of material.

Another type of ground engaging baler has been demonstrated by Sherman Swan of Jeffersontown, Ky., and has been the subject of articles in agricultural magazines. The Swan baler utilizes the combination of elevating conveyor chains at the rear of a baling chamber and forwardly arched fixed guide rods which cooperate with the elevating conveyors to push hay forwardly as the machine advances along the windrow and form it into a relatively loose miniature hay stack which may contain about a quarter ton of hay. A problem with the Swan type of baler is that it does roll the hay into a rather loose bundle, and there is nothing in the Swan apparatus which is capable of compressing the hay into a reasonably compact roll.

SUMMARY OF THE INVENTION

The apparatus of the present invention is a ground engaging hay baler which obviates the above mentioned difficulties of both the previously known types of ground engaging bale rolling devices. At the rear of a wheeled frame which defines a baling chamber there is an elevating conveyor means which lifts hay in a swath and pushes it forward as the apparatus moves along the swath. In the baling chamber forward of the elevating conveyor means is traction conveyor means which is separate from the elevating conveyor means and which is mounted so that it bears upon a forming bale in the chamber and is driven to roll the bale forward. The traction conveyor means rises as the bale increases in size, and the pressure that it places on the forming bale may be varied in any suitable way.

In one embodiment of the invention, the traction conveyor means moves upwardly in a translatory fashion, while in another embodiment it is pivoted at its rear end adjacent the elevating conveyor means and swings upwardly about its pivot as the bale increases in size.

In addition to permitting a compact bale to be rolled, the apparatus eliminates the problem of loosening the outer layer of material in the bale as the bale is released from the chamber, and also provides great flexibility in handling different types of material because the elevating conveyor means and the traction conveyor means may be driven at different speeds for optimal handling of different fodder crops under varying conditions.

THE DRAWINGS

FIG. 1 is a fragmentary side elevational view of a first embodiment of the invention in which the traction conveyor means moves up and down in the baling chamber in a translatory fashion, with the elevating conveyor means being illustrated in solid lines in its bale rolling position and in broken lines in a bale release position;

FIG. 2 is a fragmentary side elevational view of a second embodiment of the invention which also has the traction conveyor means mounted for translatory movement but which has modified means for controlling the movement of the traction conveyor means and for driving both the elevating conveyor means and the traction conveyor means;

FIG. 3 is a fragmentary plan view of the apparatus of FIG. 2;

FIG. 4 is a hydraulic circuit diagram for the apparatus of FIG. 2;

FIG. 5 is a side elevational view of a third embodiment of the apparatus in which the traction conveyor means is pivoted at the rear of the baling chamber, the apparatus being shown in bale rolling position; and FIG. 6 is a view of the apparatus of FIG. 5 in bale releasing position.

DETAILED DESCRIPTION OF THE INVENTION

Referring to the drawings in detail, and referring first to FIG. 1, the first form of the present invention includes a wheeled frame, indicated generally at 10, having an integral draft tongue 11 for attachment to the draft means of a farm tractor. The wheeled frame includes rear frame uprights 12, front frame uprights 13, horizontal top frame members 14, inclined upper frame members 15, and diagonal side frame beams 16. Cross frame members (not shown) extend across the upper rear corner of the frame and across forward parts of the frame. A housing 17 at the front of the frame contains a hydraulic motor (not shown) having a shaft 18 on which a sprocket 19 is mounted; and to the rear of the housing 17 there is a cross shaft 20 supported in the wheeled frame 10 and an input sprocket 21 on the shaft 20 is driven from the hydraulic motor through a drive chain 22. A tensioning sprocket 23 bears on the chain 22.

At the rear of the wheeled frame 10 is elevating conveyor means, indicated generally at 30, which includes a pair of elevating conveyor frames 31 which are pivoted at 32 on the rear upper corner of the wheeled frame so as to be movable between a downwardly extending baling position illustrated in full lines and a rearwardly extending bale release position indicated in broken lines. A set of upper elevating conveyor sprockets 33 have their centers of rotation on the pivot shaft 32, and a set of lower elevating conveyor sprockets 34 are rotatable on a shaft 35 at the lower end of the elevating conveyor frame 31. A set of elevating conveyor chains 36 provided with raddles that carry hay engaging fingers 36a are trained around the sprockets 33 and 34 of the upper and lower sprocket sets.

Drive means for the elevating conveyor means 30 includes a pulley 37 which is keyed to the sprocket 21, a pulley 38 directly drivingly connected to the upper sprocket set 33, and a drive belt 39 connecting the pulleys 37 and 38 to drive the elevating conveyor chains 36 in the direction indicated by the arrow around the sprocket 34 so that the chains and the hay engaging fingers move upwardly along the front of the elevating conveyor means and downwardly along the back thereof.

Traction conveyor means, indicated generally at 40, includes a traction conveyor frame 41 which has on each side a pair of upstanding guide rods 42 each of which passes through a guide bushing as illustrated at 43, said bushings being mounted in cross members of the wheeled frame. Thus, the traction conveyor frame 41 is free to move up and down in a translatory fashion, and is confined by the guide means 42-43 to such movement. Compression springs 44 surround the guide rods 42 to urge the traction frame 41 downwardly, and thus resiliently resist upward movement of said frame. Prestress of the springs 44 may be adjusted by movable spring stops 45. The traction conveyor means also includes a rear cross shaft 46 and a front cross shaft 47 at the two ends of the frame 41, sets of rear traction sprockets 48 and front traction sprockets 49 are mounted on said shafts, and traction chains 50 which surround the sprockets 48 and 49 of the sprocket sets are provided with raddles that carry traction fingers 50a.

The traction conveyor means 40 is suspended from the wheeled frame 10 by a suspension system, indicated generally at 51, that includes a pair of control arms 52 pivoted at 53 on the sides of the wheeled frame, and a hydraulic cylinder and piston unit 54 which has one end pivotally mounted on a bracket 55 and the other end pivotally connected at 56 to the lower end of the arm 52. At the free end of the arm 52 is a pulley 57 the position of which with respect to the traction conveyor means 40 is determined by the degree of extension of the piston rod of the cylindr and piston unit 54.

Also forming part of the suspension means 51 are rearward suspension pulleys 58 and forward suspension pulleys 59 which are positioned, respectively, above the rearward and forward ends of the traction conveyor frame 41, connecting pulleys 60 and 61 which are coaxial with the sprocket sets 48 and 49, respectively, and a pair of pulleys 62 coaxial with the shaft 20, one of which is keyed to the sprocket 21 to serve as a drive pulley. Continuous suspension belts 63 are trained over the pulley 57, clear of the forward suspension pulley 59 and around the rearward pulley 58, under the pulleys 60 and 61 on the traction frame 41, around the suspension pulley 58 and beneath the pulley 62. The pulley systems 57-58-59-60-61 and 62 on the two sides of the apparatus and the suspension belts 63 trained around those pulleys thus serve to suspend the traction conveyor means 40, and the movement of the pivoted arms 52 controls the vertical position of the traction conveyor means 40 in the wheeled frame 10.

One of the pulleys 62, as previously stated, is keyed to the sprocket 21; and one of the pulleys 60 or one of the pulleys 61 on the traction conveyor frame 41 is drivingly connected to the associated sprocket set so as to drive the traction conveyor chains 50 forwardly along their lower run and rearwardly along their upper run. Thus, one of the pulley and belt systems serves both as suspension means and as part of the drive means for the traction conveyor means 40.

Movement of the elevating conveyor frame 30 is controlled by a pair of hydraulic cylinder and piston units 64 which are pivotally connected at one end on pins 64a to the upright rear frame members 12, and which are pivotally connected at 65 to the elevating conveyor frame 31. Thus, when the units 64 are in the position illustrated in FIG. 1 they serve to retain the elevating conveyor means 30 in bale rolling position; while extension of the piston rods of the units 63 lifts the elevating conveyor means to the broken line position of FIG. 1 for the release of a bale.

The rear portion of the wheeled frame 10, below the traction conveyor means 40, constitutes a baling chamber C the rear end of which is normally closed by the elevating conveyor means 30.

In operation, the traction conveyor means 40 is first lower to a position in which the lower run of the traction chains 50 is approximately opposite the top of the wheels 10a of the frame 10, so that after a relatively small amount of material has been lifted by the elevating conveyor chains 36 and pushed forwardly by forward movement the material is engaged by the traction conveyor fingers 50a so as to be positively rolled at the same time it is compacted by the weight of the traction conveyor means 40 pressed downwardly by the springs 44. As the size of the bale increases the cylinder and piston unit 54, which had originally had its piston rod fully extended, is gradually retracted to swing the pulleys 57 forwardly and thus elevate the traction conveyor means 40 as the size of the bale increases.

When the traction conveyor means 40 reaches a predetermined height an actuation finger 66 on one of the pivoted arms 52 strikes an operating lever 67 of a hydraulic pilot valve 68 to admit hydraulic fluid to the cylinder of the cylinder and piston unit 64 in order to swing the elevating conveyor assembly 30 upwardly to release the finished bale from the chamber C. The actuating finger 66 is adjustably mounted in a bracket 69 to control the point at which a bale is released from the chamber and thus permit the apparatus to roll bales of different sizes.

As shown in FIG. 1 the pulleys 60 and 61 on the traction frame are of smaller diameter than the drive pulley 38 for the elevating conveyor so as to drive the traction conveyor and the pick up conveyor at different speeds. Alternatively, of course, the same result can be reached by making the pulleys 37 and 62 of different sizes.

Referring now to FIGS. 2 and 3, a wheeled frame 110 is similar to the wheeled frame 10 in that it includes wheels 110a, a draft tongue 111, rear upright frame members 112, front frame uprights 113, horizontal top frame members 114, and inclined upper frame members 115. There are also upright intermediate frame members 116. At the forward part of the frame is a hydraulic control and drive system housing 117 that contains hydraulic control components which will be described in detail in conjunction with FIG. 4.

Elevating conveyor means 130 at the rear of the wheeled frame 110 is the same as the elevating conveyor means 30 in that it includes an elevating conveyor frame 131 which has its upper end pivotally mounted at 132 on the rear upper corner of the wheeled frame, and in that it has elevating conveyor sprocket sets 133 and 134 at its upper and lower ends, respectively, which carry elevating conveyor chains 136 having hay engaging fingers 136a.

Drive means for the elevating conveyor means 130 consists of a hydraulic motor 137 which is mounted upon a top frame member 114 and which has an output shaft carrying a sprocket 137a. A sprocket 138 at the upper end of the elevating conveyor means is drivingly connected to the upper sprocket set 133 and is driven from the motor sprocket 137a by a drive chain 139. Operation of the elevating conveyor motor 137 is controlled through the hydraulic control system which will be described hereinafter.

Traction conveyor means 140 includes a traction conveyor frame 141 which is best seen in FIG. 3 to have transversely projecting pairs of guide rollers 142 adjacent each of its corners, and each guide roller pair loosely embraces an upright guide web 143 which extends along one of the upright frame members 112 or 116.

The traction conveyor means 140 is like the traction conveyor means 40 in that it includes a traction conveyor frame 141, a front sprocket shaft 146, a rear sprocket shaft 147, a front sprocket set 148, a rear sprocket set 149, traction chains 150 trained around the sprocket sets 148 and 149, and traction fingers 150a on the chains. Suspension means 151 for the traction conveyor means 140 includes a cross shaft 152 in the front upright frame members 113, and a lever structure 153 which has its fulcrum 154 on the cross shaft 152. FIG. 3 shows one side of the lever structure 153 which consists of two parallel beams 155 the front ends of which are connected by a cross member 156. The lever structure includes first arms 153a and second arms 153b.

The suspension means 151 also includes a hydraulic cylinder and piston unit 157 which is pivotally mounted at 158 on a cylinder support structure 159 that extend forwardly from the front upright frame 113 of the wheeled frame 110. The upper end of the cylinder and piston unit 157 is pivotally connected at 160 to the front cross member 156, and thus to the front arm 153a of the lever structure 153; while the second arm 153b of the lever structure is connected by pivots 161 to links 162 which are pivoted at 162a on upstanding brackets 141a on the traction conveyor frame 141.

The drive means for the traction conveyor means 140 consists of a hydraulic motor 163 which is mounted on one side of the traction conveyor frame 141 and is provided with a gear box 163a which makes a driving connection with the rear traction conveyor shaft 147.

As in the first form of the invention, a hydraulic cylinder and piston unit 164 is pivotally connected at 164a to a rear frame upright 112, and by a pivot 165 to the elevating conveyor frame 131 in order to move the elevating conveyor means between the full line baling position and the broken line bale release position.

Actuation of the hydraulic cylinder and piston unit 164 is accomplished by the same means as in the first form of the apparatus, but in the present structure a bracket 169 for an adjustable valve actuating finger 166 is mounted on one of the lever beams 155 where the finger may operate an actuating lever 167 of a pilot valve 168 which is supported on a bracket 159a on the cylinder support structure 159.

Turning now to the hydraulic circuit of FIG. 4, the cylinder and piston unit 157, the cylinder and piston unit 164, the hydraulic elevating conveyor motor 137, and the hydraulic traction conveyor motor 163 are all controlled by a hydraulic control circuit, indicated generally at 170, which includes: a sump 171; a fixed displacement pump 172 which supplies fluid under pressure to the entire system; a pilot operated control valve 173 which includes a relief valve 173a; a flow control valve 174 which controls the flow of fluid to the motors 137 and 163; a check valve 175 in the circuit for the motors 137 and 163; and an accumulator 176 with an associated balanced piston type unloading valve 177 in cooperation with the cylinder and piston unit 157 through a normally open single flow valve 178. The control valve 173 is pilot operated under the control of the pilot valve 168 which, as illustrated, is a single flow valve with a normally closed path.

In the position illustrated in FIG. 4, the control valve 173 is in a baling setting which hydraulic fluid supplied under pressure to the cylinder and piston unit 164 to hold the elevating conveyor means 130 in its baling position, and with fluid also supplied through the flow control valve 174 to the motors 137 and 163 which drive the elevating conveyor means and the traction conveyor means, respectively.

The system including the cylinder and piston unit 157, the accumulator 176, and the unloading valve 177 functions as a means resisting upward movement of the traction conveyor means 140; and the pressure in the system may be varied by turning a manual adjusting screw in the unloading valve so as to vary the amount of pressure required to elevate the traction conveyor means 140 and thus adjust the density of the bale.

When a bale in the baling chamber has reached a desired size the movement of the traction conveyor suspension lever 153, through the actuating finger 166, moves the pilot valve 168 to its open position and shifts the control valve 173 to a discharge position in which fluid under pressure is supplied to the cylinder and piston unit 164 to move the elevating conveyor means 130 to its discharge position. When the control valve 173 is in its release setting no fluid is supplied to the motors 137 and 163, and the check valve 175 permits the motors to idle in reverse so that the traction conveyor chains 150 will not interfere with dicharge of the bale from the baling chamber.

Return of the control valve 173 to its drive position is effectuated by a normally closed pilot valve 179 which is mounted in the hydraulic system housing 117 where its control plunger 180 may be contacted for actuation by an actuator member 181 that is pivoted on a bracket 182 on the housing 117 and urged torward a rest position by a spring 182a. When the baler is clear of a discharge bale, the pilot valve 179 may be opened by pulling on a cord 181a to pivot the actuator member 181 and thus return the control valve 173 to its drive position, thereby retracting the piston rod of the cylinder and piston unit 164 and returning the elevating conveyor means 130 to its baling position.

The pilot valve 179 also controls the normally open valve 178 in the accumulator circuit and a pair of normally closed valves 183 and 184 in a return circuit for the cylinder and piston unit 157. Actuation of the pilot valve 179 closes the normally open valve 178 to isolate the cylinder and piston unit 157 from the accumulator 176, and opens the valves 183 and 184 which connect the cylinder and piston unit 157 into the circuit with the cylinder and piston unit 164 so as to extend the piston rod of the unit 157 and thus lower the traction conveyor means 140 to its starting position simultaneously with the return of the elevating conveyor means 130 to baling position.

The cord 181a is held until the conveyor means 130 and 140 are properly positioned, and is then released to permit the spring 182 to return the actuator member 181 to its rest position and thus permit the pilot valve 179 to close.

Referring now to FIGS. 5 and 6, a frame 210 having wheels 210a includes a forwardly inclined rear frame member 212 and diagonal side frame members 213. There are cross members (not shown) at the two ends of the inclined frame member 213.

Draft means for the wheeled frame 210 is indicated generally at 211, and includes longitudinal side beams 214 the rear ends of which are pivotally connected at 215 to the inclined frame members 213, and a bifurcated connector 216 pivoted at 217 to the front of the side beams 214 and adapted to receive a pintle for connection to the draft means of a farm tractor.

Drive means for the baling mechanism, indicated generally at 220, includes a hydraulic motor (not shown) which is mounted on the wheeled frame 210 and has an output shaft 221 carrying a sprocket 222, and a drive chain 223 is trained around the sprocket 222 and around a power input sprocket 224. A tensioning sprocket 225 is also engaged by the chain 223.

At the rear of the frame 210 is elevating conveyor means, indicated generally at 230, which includes an upper shaft 232 on which a series of elevating conveyor upper sprockets is mounted between the frame members 212, and a set of lower sprockets 234 carried on a lower elevating conveyor shaft 235 at the rear of the wheeled frame 210. A set of elevating conveyor chains 236 are trained around the sprockets 233 and 234, and have hay engaging fingers 236a. The elevating conveyor means 230 has an input sheave 238 keyed to one end of the shaft 232.

Traction conveyor means, indicated generally at 240, includes a traction conveyor frame 241 the rear end of which is supported by a pivot 242 on a rearward extension 212a of the rear frame member 212. Thus, the forward end of the traction conveyor frame 241 may move up and down with respect to the wheeled frame 210, and a set of tension springs 244 connected between the lower portion of the wheeled frame 210 and the forward end portion 241a of the traction conveyor frame 241 resiliently resists upward movement of the latter frame about its pivot 242.

The traction conveyor means also includes a front traction sprocket shaft 247 in the forward end portion of the traction frame 241, a set of rear traction sprockets 248 journalled on the pivot 242, a set of front traction sprockets 249 journalled on the shaft 247, a set of traction conveyor chains 250 trained around the sprocket sets 248 and 249, and hay engaging fingers 250a on the chains. Also journalled on the pivot shaft 242 and making a driving connection with the rear traction sprocket set 248 is a drive sheave 260.

The drive for the elevating conveyor means 230 and the traction conveyor means 240 includes a sheave 261 keyed to the sprocket 224 and a drive belt 262 which is trained around the sheaves 260 and 261. A transfer sheave 263 is keyed to the sheave 260 in the same plane with the pulley 238 on the elevating conveyor means 230, and a drive belt 264 drives the elevating conveyor chains 236 from the pulley 263. The drive means drives the elevating conveyor chains 236 upward in their forward run and drives the traction conveyor chains 250 forward in their bottom run.

In the structure of FIGS. 5 and 6 the entire wheeled frame 210 is turned on the pivot 215 to elevate its rear end as seen in FIG. 6, and this movement is produced by a bale release mechanism, indicated generally at 270. An upstanding frame 271 on the draft means 214 provides a support for one end of a hydraulic cylinder 272 which is connected by a pivot 273 on a bracket 274. The means 270 also includes motion multiplying means, indicated generally at 280, which includes a large sprocket 281 that is journalled on a cross shaft 282 mounted in brackets 283 at the rear of the draft means 214. An arm 284 which is riveted to the sprocket 281 has at its upper end a pivot 276 for a piston rod 275 of the hydraulic cylinder unit 272. The motion multiplying means also includes a small sprocket 285 which is journalled upon the pivot 215 and fixedly secured to the inclined wheeled frame member 213 so that rotation of the sprocket 285 about the pivot 215 may rotate the entire frame. The motion multiplying means is completed by a chain 286 which is trained around the sprockets 281 and 285, so that retraction of the piston rod 275 from the position of FIG. 5 to the position of FIG. 6 acts through the motion multiplying means 280 to tilt the frame about the pivot 215.

At the front of the wheeled frame 210 are downwardly and forwardly extending projections 210b on which are stub shafts 210c to receive auxiliary wheels 210d which are clear of the ground in the baling position of FIG. 5 and which support the forward end of the wheeled frame 210 in the tilted, bale discharging position of FIG. 6.

Tilting of the frame 210 to release a bale may be initiated manually from the tractor by means of a pull cord or a chain which opens a normally closed valve in a hydraulic circuit for the piston 272, in a well known manner. Alternatively, the upward movement of the traction conveyor frame 241 as the size of a bale increases may automatically open a valve to retract the piston rod 275 in order to tilt the wheeled frame 210 for bale release, and return of the apparatus to the baling position of FIG. 5 may be accomplished by another valve which is mounted to be actuated by the pivotal movement of the frame 210 with respect to the draft means 214.

The foregoing detailed description is given for clearness of understanding only and no unnecessary limitations should be understood therefrom, as modifications will be obvious to those skilled in the art.

I claim:

1. Hay bale rolling apparatus comprising, in combination:

a wheeled frame defining a baling chamber which is open at the bottom.

rotary hay elevating conveyor means supported on said frame at the rear of the baling chamber which includes a series of hay engaging elevating fingers on and surrounding the elevating conveyor means to engage hay in a swath and move the hay upwardly and forwardly as the apparatus moves forwardly along the swath;

elevating conveyor drive means which drives the elevating conveyor means so that the fingers move upwardly at the front of the elevating conveyor means and downwardly at the rear of said means;

separate rotary bale rolling traction conveyor means in the chamber which includes a traction frame the rear end of which is adjacent the elevating conveyor means, a series of hay engaging traction fingers on and surrounding the traction conveyor means to engage hay in a forming bale, and support means mounting the traction frame on said wheeled frame so that at least its forward end is movable up and down in the chamber, whereby said traction fingers may initially engage hay near the bottom of the chamber and may move upwardly as a bale is rolled in the chamber, said traction conveyor means bearing on the forming bale to compact it;

traction conveyor drive means which drives the traction conveyor so that the traction fingers move forwardly at the bottom of the traction conveyor means and rearwardly at the top of said traction conveyor means;

and means operable to move the hay elevating conveyor means upwardly to release a bale from the chamber.

2. The apparatus of claim 1 in which the rotary hay elevating conveyor means includes a lower sprocket cross shaft that is normally close to the ground, an upper sprocket cross shaft above and slightly forward of a vertical plane through the lower shaft, elevating sprockets on said shafts, and elevating chains trained over said elevating sprockets, and in which the elevating fingers are on the chains.

3. The apparatus of claim 2 in which the traction conveyor means includes a rear sprocket cross shaft mounted in the rear end portion of the traction frame, a front sprocket cross shaft mounted in the forward portion of said traction frame, traction sprockets on said shafts, traction chains trained over said traction sprockets, and in which the traction fingers are on the chains.

4. The apparatus of claim 1 in which the traction conveyor means includes a rear sprocket cross shaft mounted in the rear end portion of the traction frame, a front sprocket cross shaft mounted in the forward portion of said traction frame, traction sprockets on said shafts, traction chains trained over said traction sprockets, and in which the traction fingers are on the chains.

5. The apparatus of claim 1 which includes means yieldingly resisting upward movement of the traction conveyor means.

6. The apparatus of claim 1 in which the elevating conveyor drive means and the traction conveyor drive means drive the respective conveyor means at different speeds.

7. The apparatus of claim 1 in which the support means mounts the traction conveyor means for vertical translatory movement and which includes guide means on the wheeled frame and on the traction frame which confines the latter to said movement.

8. The apparatus of claim 7 in which the support means comprises sheave and cable suspension means including sheaves on the wheeled frame and on the traction frame at each side of the latter, and hydraulic means operatively connected to said cable suspension means for raising and lowering the traction conveyor means.

9. The apparatus of claim 8 which includes spring means between the wheeled frame and the traction frame biasing the traction conveyor means downwardly.

10. The apparatus of claim 8 in which the traction conveyor drive means comprises means for applying driving force to a sheave of the suspension means which is on the wheeled frame and means for transmitting power from a sheave of the suspension means which is on the traction frame to one of the traction sprocket means.

11. The apparatus of claim 8 in which the support means includes a cable and sheave system on each side of the apparatus, each said system comprising suspension sheaves on the wheeled frame above the front and rear ends of the traction frame, a traction frame sheave adjacent each end of the traction frame, an arm pivoted on the wheeled frame and having a free end which is movable toward and away from the traction frame, a compensating sheave on the free end of said arm, hydraulic means for swinging said arm about its pivot, a lower sheave below the arm, and a continuous cable trained beneath the lower sheave, over the compensating sheave, over the rear suspension sheave, under the two traction frame sheaves, over the front suspension sheave and back to the lower sheave, whereby the traction frame is suspended by the cables of said systems and may be raised and lowered by swinging said arms, and in which the traction conveyor drive means includes means for applying driving force to a lower sheave of one of said systems and means on a traction sheave of said one of said systems for transmitting driving force to one of the traction conveyor sprocket means.

12. The apparatus of claim 7 in which the support means comprises a hydraulic cylinder and piston unit mounted on the wheeled frame forward of the traction frame, and a lever which has its fulcrum on the wheeled frame and its ends operatively connected to the cylinder and piston unit and to the traction frame.

13. The apparatus of claim 12 in which the lever has its fulcrum closer to the cylinder and piston unit connection than to the traction frame connection.

14. The apparatus of claim 12 in which the cylinder and piston unit is in a hydraulic circuit which includes accumulator means so that the unit yieldingly resists upward movement of the traction conveyor means.

15. The apparatus of claim 14 in which the accumulator means is adjustable to vary the force with which the unit resists upward movement of the traction frame.

16. The apparatus of claim 12 in which the traction conveyor drive means comprises a hydraulic motor mounted on the traction frame.

17. The apparatus of claim 7 in which the guide means comprises upstanding guide rods surmounting the traction frame and guidingly engaging means on the top of the wheeled frame.

18. The apparatus of claim 7 in which the guide means comprises an upright guide track in the wheeled frame adjacent each corner of the traction frame, and shoes on the traction frame engaging said guide tracks.

19. The apparatus of claim 1 in which the support means for the traction frame comprises a transverse pivotal connection between the rear end portion of the traction frame and the wheeled frame.

20. The apparatus of claim 19 which includes resilient means resisting upward pivotal movement of the traction frame.

21. The apparatus of claim 20 which includes means for adjusting the force with which the resilient means resists upward pivotal movement of the traction frame.

22. The apparatus of claim 1 in which the elevating conveyor means includes an upright frame in which the rotary means is mounted, means pivoting the upper end of said upright frame on the wheeled frame, means normally retaining said upright frame in an upright position, and means for pivoting the upright frame rearwardly to release a bale from the chamber.

23. The apparatus of claim 22 which includes hydraulic cylinder and piston means having a first position in which it retains the upright frame in its upright position, and a hydraulic circuit for the cylinder and piston including a control valve actuable when the bale reaches a predetermined size to move the piston for pivoting said upright frame.

24.. The apparatus of claim 23 which includes a control valve actuator positioned to be contacted by an actuating finger which moves coordinately with the traction conveyor means so as to release a bale when said traction conveyor means reaches a predetermined height.

25. The apparatus of claim 24 in which the position of the actuating finger is adjustable to vary the size of bales released.

26. The apparatus of claim 22 in which the elevating conveyor drive means comprises a hydraulic motor mounted on the upright frame and drivingly connected with the rotary means.

27. The apparatus of claim 26 in which the support means mounts the traction frame for vertical translatory movement, and in which the traction conveyor drive means comprises a hydraulic motor mounted on the traction frame.

28. The apparatus of claim 22 in which the support means mounts the traction frame for vertical translatory movement, and which includes guide means on the wheeled frame and on the traction frame which confines the latter to said movement.

29. The apparatus of claim 28 in which the support means comprises sheave and cable suspension means including sheaves on the wheeled frame and on the traction frame at each side of the latter, and hydraulic means operatively connected to said cable suspension means for raising and lowering the traction conveyor means.

30. The apparatus of claim 29 which includes spring means between the wheeled frame and the traction frame biasing the traction conveyor means downwardly.

31. The apparatus of claim 29 in which the traction conveyor drive means comprises means for applying driving force to a sheave of the suspension means which is on the wheeled frame and means for transmitting power from a sheave of the suspension means which is on the traction frame to one of the traction sprocket means.

32. The apparatus of claim 28 in which the support means includes a cable and sheave system on each side of the apparatus, each said system comprising suspension sheaves on the wheeled frame above the front and rear ends of the traction frame, a traction frame sheave adjacent each end of the traction frame, an arm pivoted on the wheeled frame and having a free end which is movable toward and away from the traction frame, a compensating sheave on the free end of said arm, hydraulic means for swinging said arm about its pivot, a lower sheave below the arm, and a continuous cable trained beneath the lower sheave, over the compensating sheave, over the rear suspension sheave, under the two traction frame sheaves, over the front suspension sheave and back to the lower sheave, whereby the traction frame is suspended by the cable of said systems and may be raised and lowered by swinging said arms, and in which the traction conveyor drive means includes means for applying driving force to lower sheave of one of said systems and means on a traction sheave of said one of said system for transmitting driving force to one of the traction conveyor sprocket means.

33. The apparatus of claim 22 in which the support means comprises a hydraulic cylinder and piston unit mounted on the wheeled frame forward of the traction frame, and a lever which has its fulcrum on the wheeled frame and its ends operatively connected to the cylinder and piston unit and to the traction frame.

34. The apparatus of claim 33 in which the lever has its fulcrum closer to the cylinder and piston unit connection than to the traction frame connection.

35. The apparatus of claim 33 in which the cylinder and piston unit is in a hydraulic circuit which includes accumulator means so that the unit yieldingly resists upward movement of the traction conveyor means.

36. The apparatus of claim 35 in which the accumulator means is adjustable to vary the force with which the unit resists upward movement of the traction frame.

37. The apparatus of claim 33 in which the traction conveyor drive means comprises a hydraulic motor mounted on the traction frame.

38. The apparatus of claim 22 in which the guide means comprises upstanding guide rods surmounting the traction frame and guidingly engaging means on the top of the wheeled frame.

39. The apparatus of claim 22 in which the guide means comprises an upright guide track in the wheeled frame adjacent each corner of the traction frame, and shoes on the traction frame engaging said guide tracks.

40. The apparatus of claim 1 in which the elevating conveyor means occupies a fixed position at the rear of the wheeled frame, and in which hydraulic cylinder and piston means is provided with a piston which is extended to tilt the wheeled frame forwardly and thereby release a bale from the chamber.

41. The apparatus of claim 40 in which the support means for the traction frame comprises a transverse pivotal connection between the rear end portion of the traction frame and the wheeled frame.

42. The apparatus of claim 41 which includes resilient means resisting upward pivotal movement of the traction frame.

43. The apparatus of claim 42 which includes means for adjusting the force with which the resilient means resists upward pivotal movement of the traction frame.

44. The apparatus of claim 40 in which the hydraulic cylinder and piston means includes a hydraulic circuit with a control valve actuable when the bale reaches a predetermined size to extend the piston.

45. The apparatus of claim 44 which includes a control valve actuator positioned to be contacted by an actuating finger which moves coordinately with the traction conveyor means so as to release a bale when said traction conveyor means reaches a predetermined height.

46. The apparatus of claim 45 in which the position of the actuating finger is adjustable to vary the size of bales released from the chamber.

* * * * *